(No Model.) 2 Sheets—Sheet 1.
T. SCHOFIELD.
APPARATUS FOR ELEVATING AND DISCHARGING GRAIN.
No. 358,075. Patented Feb. 22, 1887.
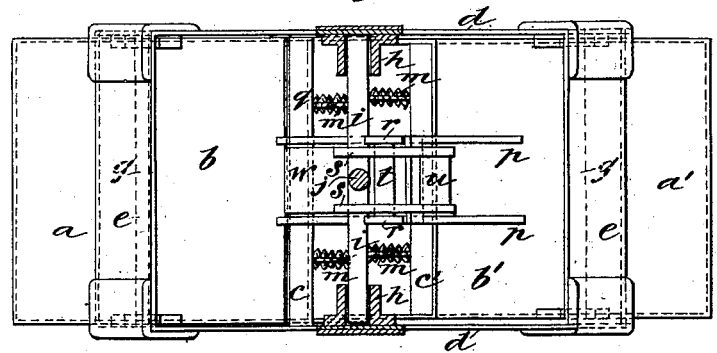

(No Model.) 2 Sheets—Sheet 2.
T. SCHOFIELD.
APPARATUS FOR ELEVATING AND DISCHARGING GRAIN.
No. 358,075. Patented Feb. 22, 1887.
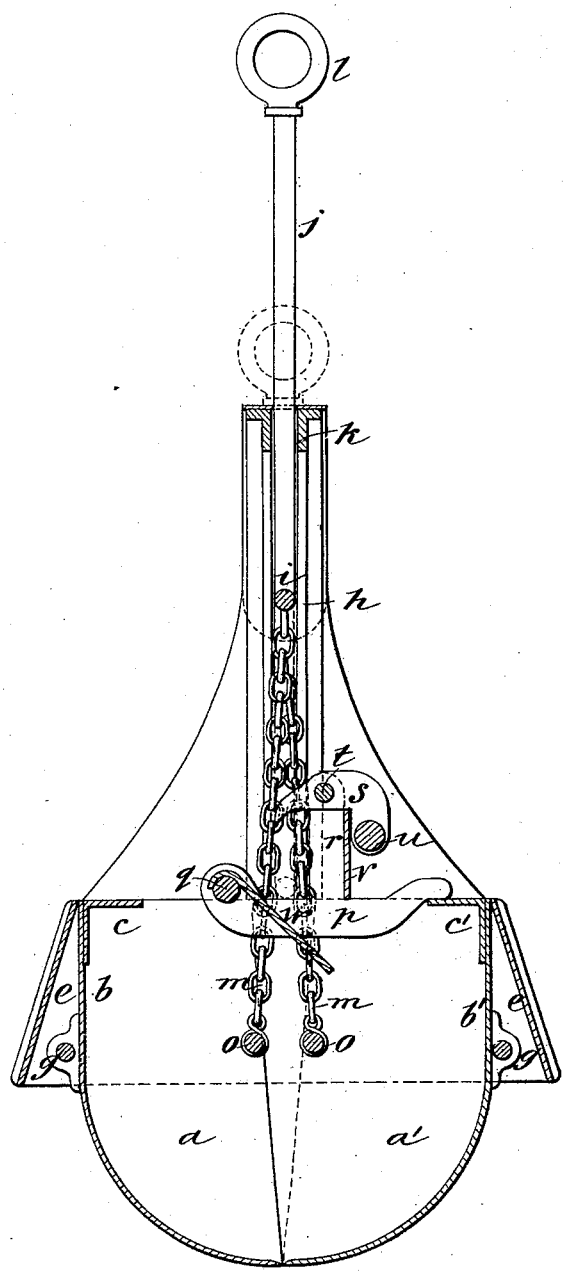
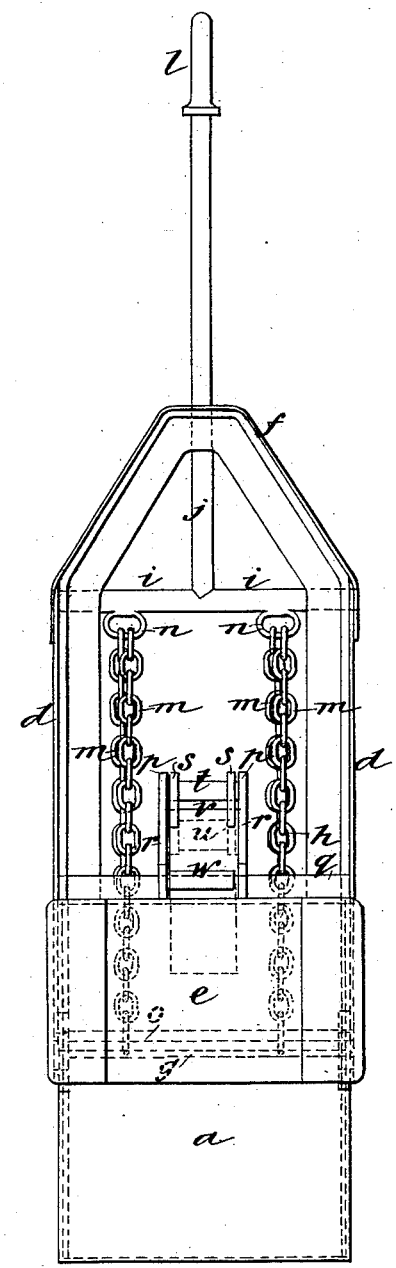
Witnesses.
Will T. Norton
R. B. Washington
Inventor.
Thomas Schofield
By John J. Halsted & Son
his Atty's
N. PETERS, Photo-Lithographer, Washington, D. C.

UNITED STATES PATENT OFFICE.

THOMAS SCHOFIELD, OF LONDON, ENGLAND.

APPARATUS FOR ELEVATING AND DISCHARGING GRAIN.

SPECIFICATION forming part of Letters Patent No. 358,075, dated February 22, 1887.

Application filed March 24, 1886. Serial No. 196,331. (No model.)

*To all whom it may concern:*

Be it known that I, THOMAS SCHOFIELD, a subject of the Queen of Great Britain, residing at London, England, have invented new and useful Improvements in Apparatus for Elevating and Discharging Grain, Ballast, and other Materials, of which the following is a specification.

This invention relates to that class of elevator apparatus in which grab-buckets or grab-forks are used for elevating and discharging grain, ballast, and other materials.

The object of my invention is to construct grab-buckets having the maximum of efficiency combined with simplicity of construction and the minimum number of working parts; also to particularly admit of using them in combination with any kind of crane or derrick without requiring alteration or addition to be made to the crane or derrick.

In carrying out my invention I use a grab-bucket of suitable shape and number of sections; but I prefer to use a bucket that is semicircular in shape at the bottom and made in two halves. I provide the bucket with upwardly-projecting parts, to allow of the bucket containing more material than usual and to prevent the material spilling. I mount the bucket in a vertical casing or framing having parallel sides, and this casing contains all the parts of the apparatus. The two halves of the bucket are pivoted in the casing, which is provided with vertical parallel guide-pieces, in which travels a horizontal cross-piece (or pieces) having a vertical bar, the upper end of which works through a hole in the top of the apparatus and serves for connecting the apparatus with the crane-chain. Closing-chains (or their equivalents) are connected to the cross-piece and to each part of the bucket, for the purpose of closing the bucket in the operation of grabbing and elevating, an uprighting and lowering tripping hook or hooks is or are mounted upon an axis in the casing. This tripping-hook is brought to and held in the upright position by the bucket coming in contact with it when the bucket is closing.

In order to enable my invention to be fully understood, I will proceed to describe the same by reference to the accompanying drawings, in which—

Figure 1 is a central vertical section of an apparatus constructed according to my invention for elevating and discharging grain, ballast, and other materials, the parts being shown in the position they occupy when the bucket is open. Fig. 2 is a sectional plan on line A B of Fig. 1. Fig. 3 is a similar view to Fig. 1, but showing the parts of the apparatus in the position they occupy when the bucket is closed. Fig. 4 is an end view of Fig. 3.

Similar letters in all the figures represent similar parts.

$a$ $a'$ represent the bucket, formed semicircular in shape and in halves, as shown.

$b$ $b'$ are the upwardly-projecting parts to allow of the bucket containing more material than usual, and to prevent the material from spilling.

$d$ $d$ are the parallel sides of the vertical casing or framing, and $e$ $e$ are the ends of the same.

$f$ is a cross-piece connecting the sides $d$ $d$ at the top of the apparatus.

$g$ $g$ are the pivots of the two halves $a$ and $a'$ of the bucket, the said pivots being fixed in the sides $d$ of the casing.

$h$ $h$ are the vertical parallel guide-pieces with which the sides $d$ of the casing are provided, and $i$ is the horizontal cross-piece which travels in the same.

$j$ is the vertical bar of the horizontal cross-piece $i$, $k$ being the hole in the cross-piece $f$ through which the bar $j$ works. The bar $j$ is provided with an eye or loop, $l$, for connecting the same to the crane-chain.

$m$ $m$ $m$ $m$ are the closing-chains connected to the horizontal cross-piece at $n$ $n$, as shown in Fig. 4, and to each part of the bucket $a$ $a'$ at $o$ $o$, as shown in Figs. 1 and 3, the said chains serving to close the bucket $a$ $a'$ in the operation of grabbing and elevating. The uprighting and lowering tripping-hooks are constructed of two tumbling-pieces, $p$ $p$, turning on the axis $q$, fixed to the sides $d$ $d$ of the apparatus, and formed with vertical projections $r$ $r$, carrying hooks $s$ $s$, pivoted at $t$, and counterweighted, as shown at $u$. The projecting pieces $r$ $r$ are connected by a plate, $v$, which, when the tripping-hooks are allowed to fall, as shown in dotted lines in Fig. 1, rests upon a fixed inclined plate, $w$, secured to the axis $q$, and thereby limits the downward movement of the tripping-hooks and holds them in position ready for the part $a'$ of the bucket to raise them when the bucket is closed. The upper edge of the plate $v$ serves as a bearing or stop for the rear part of the hooks $s$, whereby the said hooks are held rigid to sustain the weight of the apparatus when suspended in the position shown in Fig. 1.

The operation of grabbing and elevating (the parts being in the position shown in Fig. 1) is as follows: On lifting the apparatus by means of the crane the bucket $a\ a'$ will remain open to its fullest extent, because the whole weight of the apparatus is upon the cross-piece $i$ and tripping-hooks, which are engaged by the former bearing under the hooks $s$ of the latter. On arriving at the material to be elevated the whole weight of the apparatus will rest thereon, and the bar $j$ and cross-piece $i$ will descend, the latter taking the position shown in dotted lines in Fig. 1. The tripping-hooks being released from the weight and being no longer supported by the cross-piece $i$, will fall down on one side into the position shown in dotted lines in Fig. 1, leaving a clear path for the vertical bar $j$ and cross-piece $i$, when the crane-chain is hauled in, to ascend, and, by means of the chains $m$, to close the bucket $a\ a'$ into the position shown in Figs. 3 and 4, thereby grabbing and elevating the material to be raised. As the part $a'$ of the bucket is raised a flange, $c'$, thereon comes against the tumbling-piece $p$, and thereby raises the tripping-hooks again into the upright position, ready to again engage with the cross-piece $i$.

The bucket $a\ a'$ having been filled in the manner described, the operation of discharging the material is as follows: On arriving at the place where it is required to discharge the material the improved bucket $a\ a'$ and its contents must be lowered, so that the bucket shall rest on the said place, and the crane-chain being continued to be lowered out, the vertical bar $j$ and cross-piece $i$ will descend, and the latter will depress and pass by the counterweighted hooks $s$ of the tripping-hooks. Then by again hauling in the crane-chain to lift the apparatus the cross-piece $i$ and hooks $s$ will be again engaged, and the bucket $a\ a'$, being no longer held up by the chains $m$, will open and the material will be discharged therefrom, leaving the apparatus in the proper position for grabbing and elevating another load, as represented in Figs 1 and 2, and so on.

Although I have shown my improved apparatus provided with buckets, it will be obvious that where required by the nature of the material to be raised and discharged forks can be employed in place of the said buckets.

Having now particularly described and ascertained the nature of my said invention and in what manner the same is to be performed, I declare that what I claim is—

1. In an apparatus for elevating and discharging grain, ballast, and other materials, the combination, with a grab-bucket (or grab-forks) formed in two parts, of a tripping hook or hooks composed of tumbling-pieces $p\ p$, having the projections $r\ r$, carrying counterweighted pivoted hooks $s\ s$, and the plates $v$ and $w$, whereby the two parts of the bucket (or forks) are automatically opened and closed.

2. A vertically-divided bucket (or fork) made substantially as shown and described, swung on pivots $g$, having chains for closing the same and provided with upward extensions $b\ b'$, as and for the purposes set forth.

3. In combination, the vertical bar $j$, horizontal cross-piece $i$, arranged to slide in guides $h$, and tripping-hooks composed of tumbling-pieces $p\ p$, vertical projections $r\ r$, and counterweighted tripping-hooks $s\ s$, provided with suitable stops and adapted to engage with said cross-piece and to be raised into engagement by the buckets, substantially as shown and described.

4. In combination, the divided bucket or forks $a\ a'$, the tumbling-pieces and their tripping-hooks $s\ s$, the plates $v$ and $w$, chains $m\ m$, vertical bar $j$, cross-piece $i$, and guides $h$, all substantially as described.

THOMAS SCHOFIELD.

Witnesses:
G. F. REDFERN,
B. BRADY.